(12) United States Patent
Lehman et al.

(10) Patent No.: US 10,093,286 B2
(45) Date of Patent: Oct. 9, 2018

(54) TIMER BASED VEHICLE LEVELING AND STABILIZATION SYSTEM AND METHOD OF MANUFACTURE

(71) Applicant: Quadra Manufacturing, Inc., White Pigeon, MI (US)

(72) Inventors: Johnnie Eugene Lehman, Osceola, IN (US); Gary Anthony Lehman, Vicksburg, MI (US); Robert Daniel Slack, White Pigeon, MI (US)

(73) Assignee: Quadra Manufacturing, Inc., White Pigeon, MI (US)

( * ) Notice: Subject to any disclaimer, the term of this patent is extended or adjusted under 35 U.S.C. 154(b) by 130 days.

(21) Appl. No.: 14/662,598

(22) Filed: Mar. 19, 2015

(65) Prior Publication Data

US 2016/0207505 A1 Jul. 21, 2016

Related U.S. Application Data

(60) Provisional application No. 62/103,880, filed on Jan. 15, 2015.

(51) Int. Cl.
*B60S 9/10* (2006.01)

(52) U.S. Cl.
CPC ...................... *B60S 9/10* (2013.01)

(58) Field of Classification Search
CPC ................................. B60G 17/00; B60S 9/10
USPC ......................................... 701/38; 280/5.511
See application file for complete search history.

(56) References Cited

U.S. PATENT DOCUMENTS

| | | | |
|---|---|---|---|
| 4,266,790 A | 5/1981 | Uemura et al. | |
| 4,597,584 A | 7/1986 | Hanser | |
| 5,188,379 A | 2/1993 | Krause et al. | |
| 5,273,256 A * | 12/1993 | Chambers | B60S 9/06 254/425 |
| 6,050,573 A | 4/2000 | Kunz | |
| 6,450,673 B1 * | 9/2002 | Toda | B60Q 1/115 362/464 |
| 7,193,381 B2 | 3/2007 | Ford et al. | |
| 7,199,534 B2 | 4/2007 | Ford et al. | |
| 7,208,896 B2 | 4/2007 | Ford et al. | |
| 7,726,690 B1 * | 6/2010 | James | B60J 7/165 182/69.5 |
| 2003/0135312 A1 * | 7/2003 | Ford | B60S 9/02 701/36 |

(Continued)

*Primary Examiner* — Redhwan K Mawari
*Assistant Examiner* — Rodney P King
(74) *Attorney, Agent, or Firm* — Larry E. Henneman, Jr.; Henneman & Associates, PLC (57) ABSTRACT

An example leveling/stabilization system for a vehicle includes a jack, an actuator, a user interface device, and a controller. The jack is adapted to be fixed to the vehicle and is extendable from a stowed position to an auto-deployed position. The actuator is coupled to the jack and is operative to extend and retract the jack responsive to signals from the controller. The user interface device is adapted to receive input from a user. The controller is responsive to an auto-deploy signal from the user interface and operative to provide the control signals to the actuator causing the actuator to continuously extend the jack from the stowed position for a predetermined time period, thereby positioning the jack in the auto-deployed position. No level sensor is required.

18 Claims, 9 Drawing Sheets

(56) References Cited

U.S. PATENT DOCUMENTS

| | | | |
|---|---|---|---|
| 2004/0256815 A1* | 12/2004 | Eichhorn | B60S 9/12 280/6.155 |
| 2006/0082079 A1* | 4/2006 | Eichhorn | B60S 9/12 280/6.155 |
| 2008/0142768 A1 | 6/2008 | Thorpe et al. | |
| 2013/0338848 A1 | 12/2013 | Park | |
| 2014/0214283 A1 | 7/2014 | Maurer | |
| 2015/0006027 A1 | 1/2015 | Maurer | |

* cited by examiner

TIMER BASED VEHICLE LEVELING AND STABILIZATION SYSTEM AND METHOD OF MANUFACTURE

RELATED APPLICATIONS

This application claims the benefit of U.S. Provisional Patent Application Ser. No. 62/103,880 entitled "Timer Based Vehicle Leveling And Stabilization System And Method Of Manufacture," filed Jan. 15, 2015 by at least one common inventor, which is incorporated herein by reference in its entirety.

BACKGROUND OF THE INVENTION

Field of the Invention

This invention relates generally to leveling systems, and more particularly to a system and method for leveling and/or stabilizing vehicles. Even more particularly, this invention relates to a timer-based system and method for leveling and/or stabilizing vehicles.

Description of the Background Art

Leveling systems for vehicles, particularly recreational vehicles, are known in the art. Typically, known leveling systems include a plurality of jacks, each fixed to a vehicle at a particular location. For example, a recreational vehicle might include four jacks, each affixed to the recreational vehicle near a respective corner of the vehicle.

One type of known leveling system is a manual leveling system. Manual leveling systems are controlled by momentary switches operating each jack individually, in pairs, or all at the same time. Manual leveling systems are time consuming to deploy. In addition, a great number of manual adjustments can be required to obtain even a roughly level and stabilized vehicle.

Another type of leveling system is an automatic leveling system. Automatic leveling systems include a control panel which may operate in manual mode or have an "auto level" function. The "auto level" function levels a vehicle based on feedback from an inclinometer (leveling sensor). A controller drives the jacks based on readings from the leveling sensor until the vehicle is in a desired level, stabilized position.

Automatic leveling systems based on a leveling sensor are susceptible to errors resulting from an improperly mounted sensor. For example, if the leveling sensor is not mounted precisely level with the vehicle, then the vehicle will not be level even though the leveling sensor is level. Indeed, even if the leveling sensor is installed in precisely level position, it can be rendered unlevel by inadvertent impact, swelling or shifting of the structure of the vehicle to which the leveling sensor is attached, and so on. Moreover, the leveling sensors add weight and expense to the leveling system, which are undesirable features.

What is needed, therefore, is a system and method for leveling and/or stabilizing a vehicle that is fast and easy to deploy. What is also needed is a system and method for leveling and/or stabilizing a vehicle that is lighter and less expensive than known automatic leveling systems. What is also needed is a system and method for leveling and/or stabilizing a vehicle that does not require the precise position/orientation of sensors with respect to the vehicle. What is also needed is a system and method for leveling and/or stabilizing a vehicle that is not susceptible to damage or dislodging of sensors.

SUMMARY

The present invention overcomes the problems associated with the prior art by providing a timer-based system and method for leveling and stabilizing a vehicle. The invention facilitates easy, rapid deployment of jacks to level and stabilize a vehicle on flat surfaces. The invention also facilitates the manual adjustment of individual jacks to accommodate for uneven surfaces.

An example leveling system for a vehicle includes a jack, an actuator, a user interface device, and a controller. The jack is adapted to be fixed to the vehicle and is extendable from a stowed position to an auto-deployed position. The actuator is coupled to the jack and is operative to extend and retract the jack responsive to signals from the controller. The user interface device is adapted to receive input from a user. The controller is responsive to an auto-deploy signal from the user interface and operative to provide the control signals to the actuator causing the actuator to continuously extend the jack from the stowed position for a predetermined time period, thereby positioning the jack in the auto-deployed position.

The duration of the predetermined time period depends on physical characteristics of the vehicle, a relative position of the jack with respect to the vehicle, and/or the distance between the jack and the ground when the jack is in the stowed position. The duration of the time period additionally depends on physical characteristics of the actuator and/or the amount of lift required to take some weight of the vehicle off of the suspension of the vehicle. In an example embodiment, the actuator is a hydraulic actuator.

The example leveling system additionally includes a plurality of jacks. The jacks of the plurality of jacks are grouped into at least a first group and a second group. The controller, responsive to the auto-deploy signal from the user interface, is operative to provide control signals to the actuator causing the actuator to continuously extend the jacks of the first group from their stowed positions for a first predetermined time period, thereby positioning the jacks of the first group in the auto-deployed position. The controller also provides control signals to the actuator causing the actuator to continuously extend the jacks of the second group from their stowed positions for a second predetermined time period, thereby positioning the jacks of the second group in the auto-deployed position. The duration of the first predetermined time period can be different than the duration of the second predetermined time period. The controller operates without input from a level sensor.

Optionally, the actuator includes an individual actuator for each the group of jacks. As another option, the actuator includes an individual actuator for each individual jack.

The example leveling system optionally includes one or more sensors responsive to a position of an associated jack and operative to provide a signal to the controller indicative that the associated jack is in the stowed position.

The example leveling system additionally includes memory for storing a time value associated with the predetermined time period. Optionally, the time value is reconfigurable, which allows the leveling system to be used in combination with a wide variety of vehicles having different physical characteristics.

An example method for automatically deploying a plurality of jacks from a stowed position to an auto-deployed position is also disclosed. The method includes receiving input from a user indicating that the jacks are to be auto-deployed, determining whether all of the jacks are in the stowed position, retrieving a time value associated with a first group of the jacks, and driving the first group of the jacks for a predetermined time period based on the time value, thereby deploying the jacks of the first group from their stowed positions to their auto-deployed positions. The example method additionally includes retrieving a second time value associated with a second group of the jacks, and driving the second group of the jacks for a second predetermined time period based on the second time value, thereby deploying the jacks of the second group from their stowed positions to their auto-deployed positions.

In the example method, the step of determining whether all of the jacks are in their stowed positions includes receiving sensor input from each jack indicating that each jack is fully retracted. Optionally, the step of determining whether all of the jacks are in their stowed positions includes retracting the jacks until all of the jacks are in their stowed positions.

Another example leveling system for a vehicle includes a jack adapted to be fixed to the vehicle and extendable from a stowed position to a predetermined auto-deployed position. An actuator is coupled to the jack and is operative to extend and retract the jack. A user interface device is adapted to receive input from a user, and a controller, responsive to an auto-deploy signal from the user interface, is operative to provide control signals to the actuator causing the actuator to extend the jack from the stowed position to the predetermined auto-deployed position.

A controller for a leveling system of a vehicle is also disclosed. The controller includes a user interface device, memory, a drive interface, and a processing unit. The user interface device is adapted to receive input from a user. The memory stores data and code, the data including an auto-deploy time value. The processing unit is operative to process the code and, responsive to an auto-deploy signal from the user interface, operative to provide control signals via the drive interface to continuously extend the jack for a time period corresponding to the auto-deploy time value.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a timer-based system and method for leveling and stabilizing a vehicle. The invention facilitates easy, rapid deployment of jacks to level and stabilize a vehicle on flat surfaces. The invention also facilitates the manual adjustment of individual jacks to accommodate for uneven surfaces. In the following description, numerous specific details are set forth (e.g., number/type of jacks, control panel layout, etc.) in order to provide a thorough understanding of the invention. Those skilled in the art will recognize, however, that the invention may be practiced apart from these specific details. In other instances, details of well-known electronic and mechanical assembly practices (e.g., routine optimization, materials selection, etc.) and components have been omitted, so as not to unnecessarily obscure the present invention.

Figure 1:
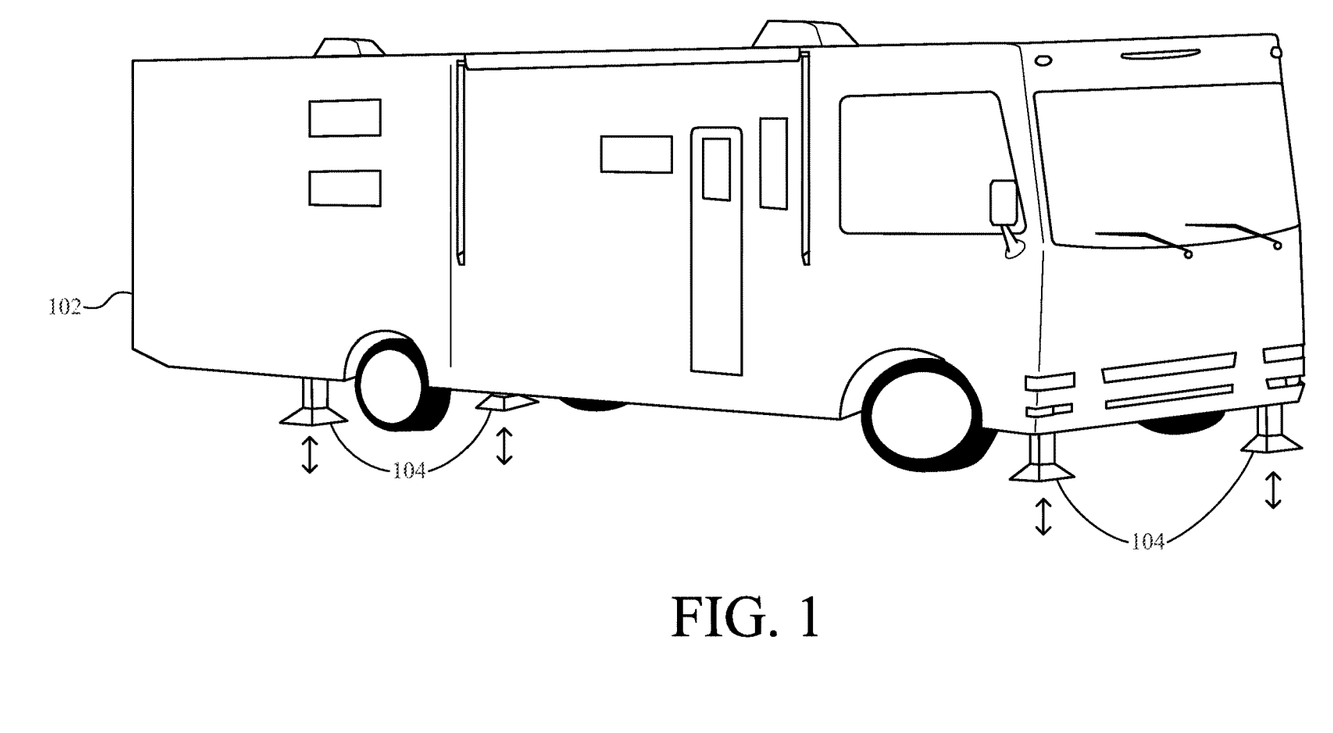
FIG. 1 shows a recreational vehicle including a leveling system according to one embodiment of the present invention.

FIG. 1 shows a recreational vehicle (RV) 102 including a leveling system according to one embodiment of the present invention. The leveling system includes four jacks 104, each located near a respective corner of the RV 102. Jacks 104 can be extended downward by the leveling system to level and stabilize RV 102. Jacks 104 can also be retracted upward to a stowed position when not in use.

Figure 2:
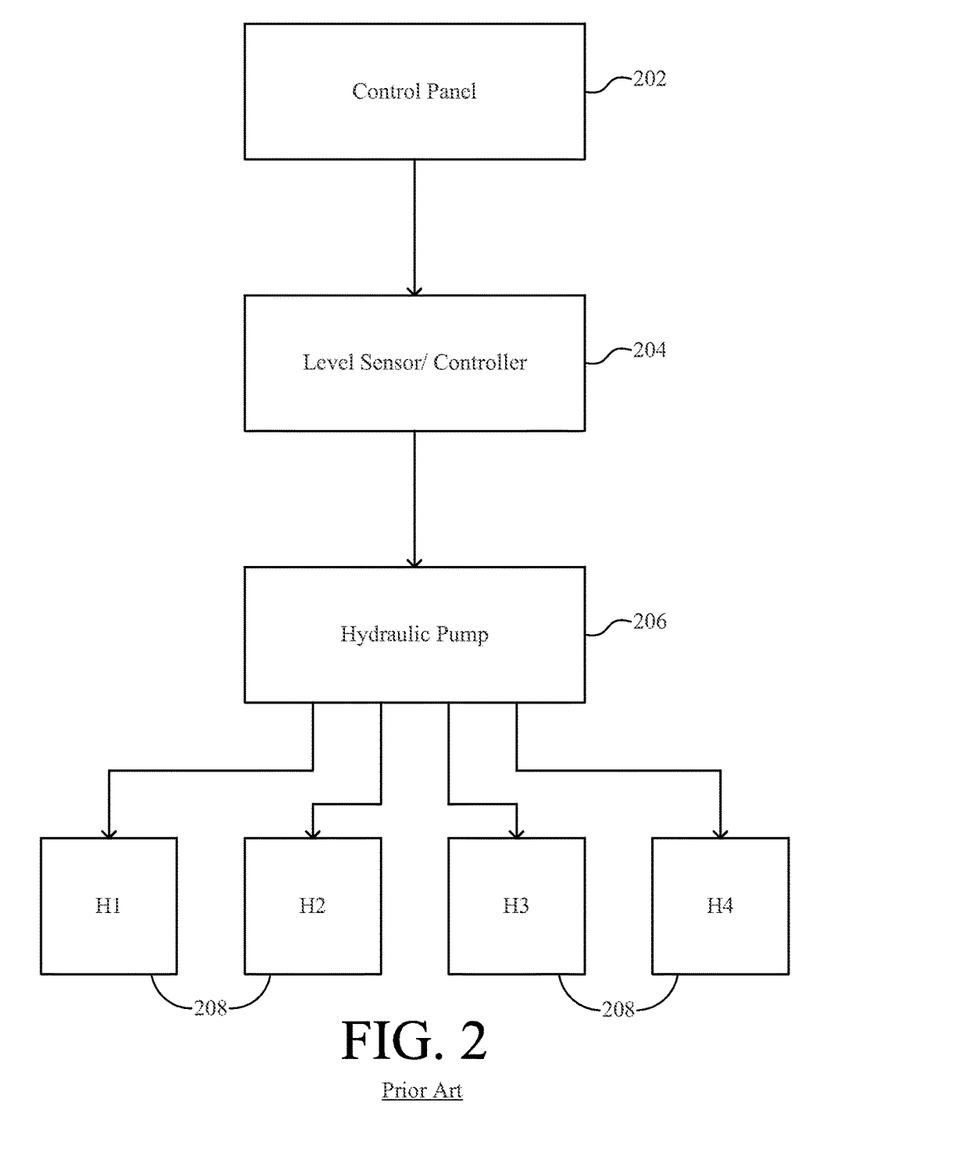
FIG. 2 is a block diagram of a prior art leveling system using a level sensor.

FIG. 2 is a block diagram of a prior art leveling system using a level sensor. A control panel 202 provides a user input to accept commands from a user. Responsive to signals from control panel 202, a level sensor based controller 204 drives a hydraulic pump 206 to selectively extend and retract individual ones of jacks 208 (H1-H4). Controller 204 independently adjusts jacks 208 based on a signal from the level sensor, until the signal from the level sensor indicates that the level sensor is level. As indicated in the background section, level sensor based leveling systems suffer from several disadvantages.

Figure 3:
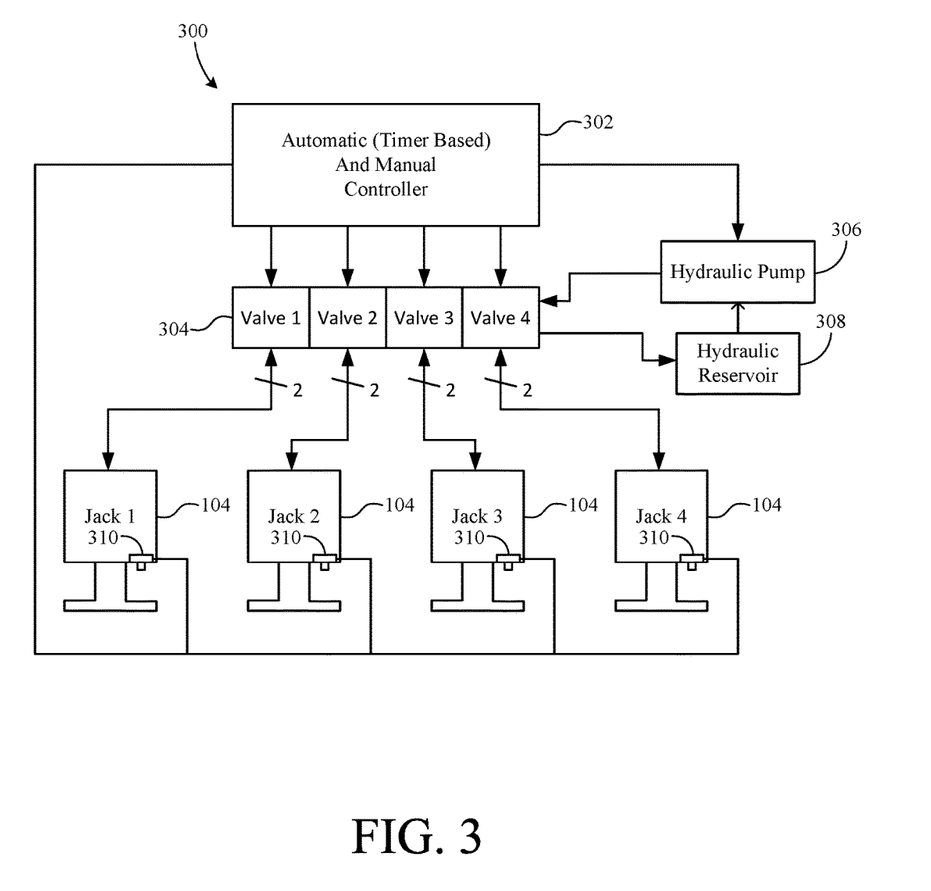
FIG. 3 is a block diagram of the timer-based leveling system of the recreational vehicle of FIG. 1 according to one example embodiment of the present invention.

FIG. 3 is a block diagram of the time-based leveling system 300 of the recreational vehicle of FIG. 1, according to one example embodiment of the present invention. System 300 includes a controller 302, a valve manifold 304, a hydraulic pump 306, hydraulic fluid reservoir 308, and a plurality of hydraulic jacks 104. No level sensor is included or required for the operation of system 300.

Controller 302 facilitates automatic deployment and manual adjustment of jacks 104. In the automatic deployment mode, controller 302 provides control signals to hydraulic pump 306 and valve manifold 304 to drive/extend each of jacks 104 for a predetermined time. The time that each jack 104 is extended need not be the same as the other of jacks 104. In one example, the jacks 104 fixed to the front of RV 102 are extended for a first predetermined time period, and the jacks 304 fixed to the rear of RV 102 are extended for a second, different predetermined time period. In general, each of jacks 304 can be extended for any desirable predetermined time period during the automatic deployment mode, independent of the other of jacks 104.

The time that each of jacks 104 is extended during automatic deployment depends on the physical characteristics of RV 102 and the particular disposition of jacks 104 with respect to RV 102. In particular, the respective extend times are calculated based at least in part on the RV 102 front and rear ride heights, the ground clearance of jacks 104 in their stowed (full up) positions, and the jack cylinder deployment speed.

The ride height is determined with RV 102 parked on a level surface with the weight of the vehicle resting on the vehicle's suspension. Vehicles do not necessarily ride in a completely level state. For example, a typical chassis might ride "nose low", meaning that the front of the vehicle sits lower than the rear of vehicle. A typical difference between the front ride height and the rear ride height of a vehicle can be, for example, 2 inches.

The ground clearance is the distance from the bottom of jack 104 in the stowed position to the ground, with RV 102 parked on a level surface and the weight of the vehicle resting on the vehicle's suspension. A typical ground clearance might be, for example, 7 inches for the front jacks 104 and 8 inches for the rear jacks 104.

In hydraulic systems, the jack cylinder deployment speed depends on the flow rate of hydraulic pump 206 and the bore diameter of the hydraulic cylinder of each jack. A typical deployment speed can be, for example, 0.5 inches per second.

In addition to the foregoing considerations, a stabilization factor can be added to the time calculation. Stabilization is provided by extending jacks 104 past the point where they first contact the ground in order to lift RV 102 beyond the ride height and take some of the weight of RV 102 off of the vehicle's suspension. When stabilized, RV 104 is suspended on four solid fixed points (jacks 104) and the tires of RV 102. A typical stabilization factor might be, for example, 1 inch.

Using the foregoing examples, the extend time for jacks 104 can be calculated as follows. The amount of extension required for the front jacks is equal to the sum of the front ground clearance (7 in.), the stabilization factor (1 in.), and the difference between the front and rear ride heights (2 in.), which totals 10 in. of required travel for the front jacks 104. Then, to calculate the required drive time, the required distance (10 in.) is divided by the cylinder deployment speed (0.5 in. per second) to obtain the required drive time (20 seconds) for front jacks 104. The amount of extension required for rear jacks is equal to the sum of the rear ground clearance (8 in.) and the stabilization factor (1 in.), which totals 9 inches of required travel for rear jacks 104. Dividing the required extension of rear jacks 104 (9 in.) by the cylinder deployment speed (0.5 in. per second) results in a drive time (18 seconds) for rear jacks 104.

These calculated drive times are based on the drive speed of an individual one of jacks 104. If more than one jack is driven at a time (e.g. both of the front jacks together), then the drive time must be multiplied by the number of simultaneously driven jacks. The reason for this is that the pump flow from hydraulic pump 306 must be distributed among the multiple jack cylinders, thereby decreasing the cylinder deployment speed of each jack proportionately.

Following the automatic deployment of jacks 104, jacks 104 can be manually adjusted individually to deal with factors such as RV 102 being parked on an inclined surface.

Figure 4:
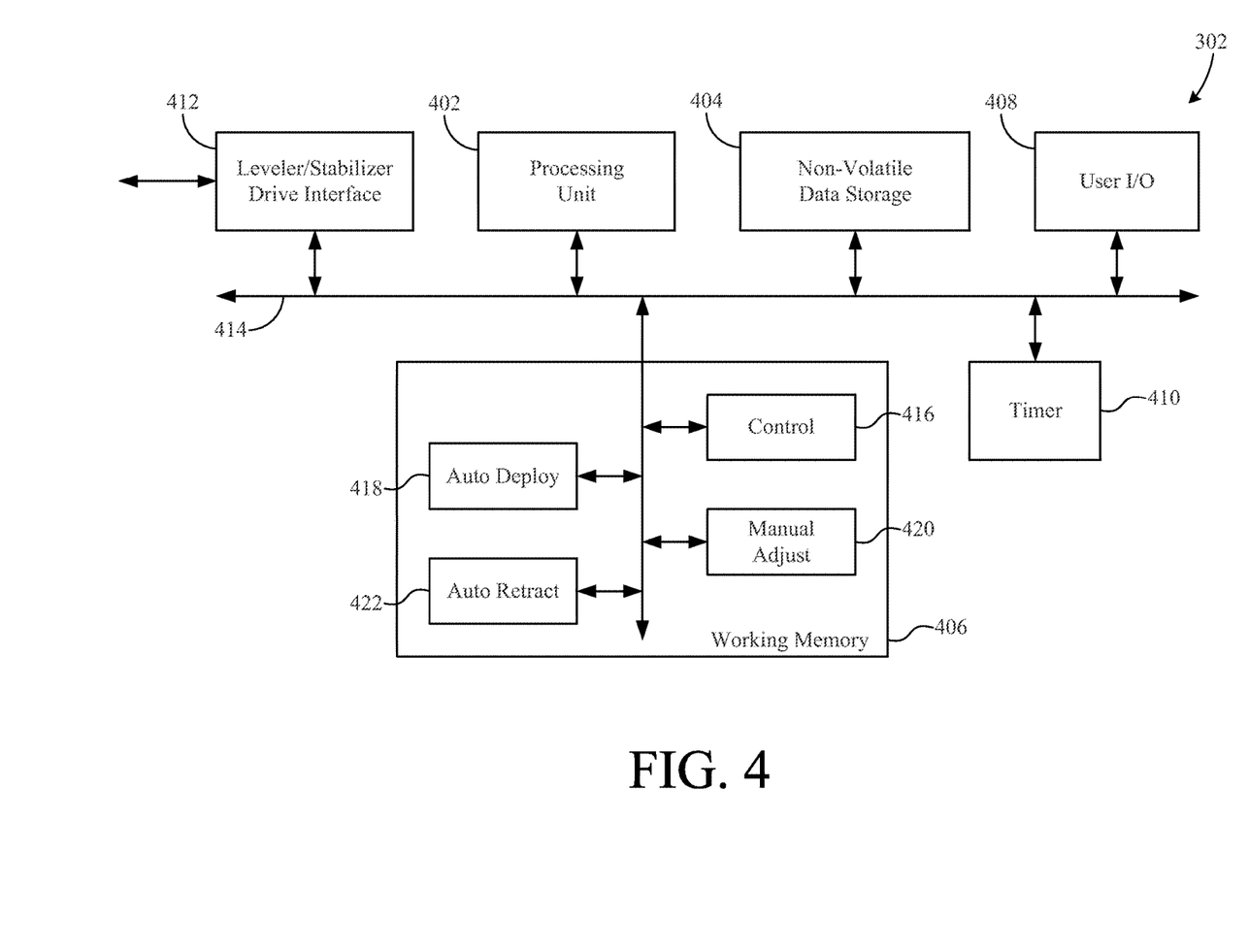
FIG. 4 is a block diagram of a controller of FIG. 3.

FIG. 4 is a block diagram of controller 302. Controller 302 includes one or more processing units 402, non-volatile data storage 404, working memory 406, user input/output (I/O) interface device(s) 408, a timer 410, and a leveler/stabilizer drive interface 412, all intercommunicating via an internal bus 414. Processing unit 402 imparts functionality to controller 302 by executing code stored in non-volatile data storage 404 and/or working memory 406. Non-volatile data storage 404 stores data and code to be accessed by processing unit 402, and retains the data and code even when controller 302 is powered down. Working memory 406 (e.g. random access memory) is used by processing unit 402 during normal operation. For example, data and code from non-volatile data storage 404 can be transferred into working memory 406 where the code is processed/executed by processing unit 402. User I/O 408 provides a means for controller 302 to receive input from and display output to a user. User I/O can include any devices (e.g., keyboard, pointing device, display panels, etc.) now known or yet to be developed. In an example embodiment, User I/O 408 includes an innovative touch panel that facilitates a user's activation of the automatic deployment mode and/or the manual adjustment mode. Timer 410 provides a means of controlling the drive times of the jacks 104 in automatic deployment mode. Leveler/Stabilizer Drive Interface provides a means for communicating control signals to valve manifold 304 and hydraulic pump 306, and for receiving sensor signals (e.g., travel limit sensors) from jacks 104.

Some, but not all, functional aspects of controller 302 are illustrated by showing blocks of code in working memory 406, which are executed by processing unit(s) 402 to cause implementation of the respective function. These blocks of code include control module 416, auto deploy module 418, manual adjust module 420, and auto retract module 422. Control module 420 provides overall control and coordination of the various aspects of controller 302. Auto deploy module 418, causes the automatic deployment of jacks 104. Manual adjust module 420 facilitates manual adjustment of individual ones of jacks 104. Auto retract module causes the automatic retraction of all jacks 104 to their fully stowed positions.

Figure 5:
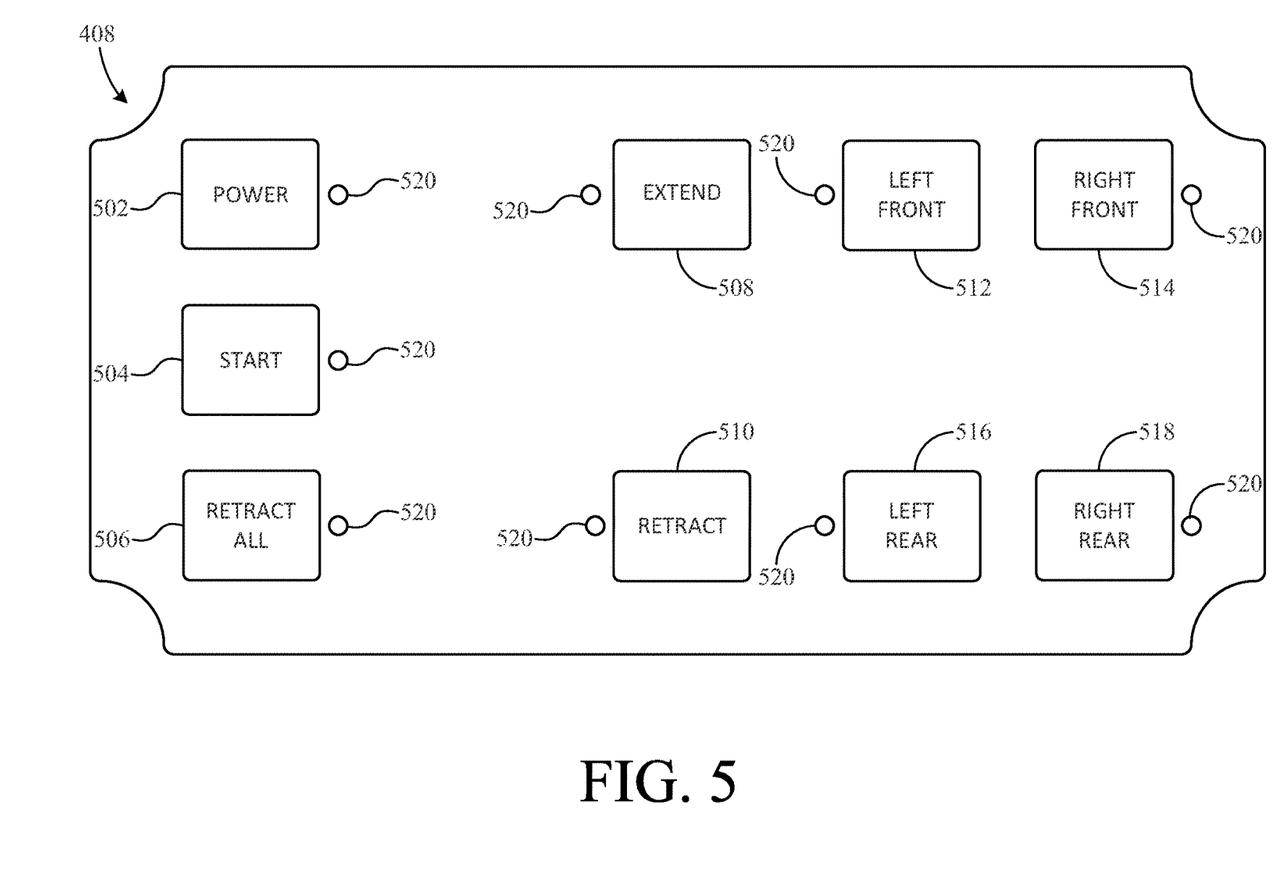
FIG. 5 is a front view of a User I/O panel of the controller of FIG. 4.

FIG. 5 is a front view of an example User I/O panel 408. In this example embodiment, panel 408 is a touch panel that includes a "Power" touch sensor 502, a "Start" touch sensor 504, a "Retract All" touch sensor 506, an "Extend" touch sensor 508, a "Retract" touch sensor 510, a "Left Front" touch sensor 512, a "Right Front" touch sensor 514, a "Left Rear" touch sensor 516, and a "Right Rear" touch sensor 518. A plurality of indicator lights 520, each associated with a respective one of touch sensors 502, 504, 506, 508, 510, 512, 514, 516, and 518, indicate when the function associated with the respective touch is active.

The operation of controller 302 will now be described with reference to FIGS. 3-5. When "Power" touch sensor 502 is contacted, controller 302 is powered up.

When controller 302 determines that "Start" sensor 504 has been contacted, controller 302 executes the auto deploy function as follows. The automatic deployment process is divided into three portions: front lift, pause, and rear lift. During the front lift process, controller 302 provides control signals to valve manifold 304, causing the two individual valves associated with the front jacks 104 to open, thereby sending fluid to the extend ports of the cylinders of the front jacks 104. The valves remain open for the predetermined drive time calculated above to achieve the desired extension of the front jacks 104. When the predetermined time has expired, controller 302 provides control signals to close the two valves associated with front jacks 104, thus completing the first portion of the auto deployment process. During the second portion of the process, controller 302 pauses for a brief, predetermined time to avoid a sudden jolt to RV 102, which might be caused by lifting the front of RV 102 and then suddenly lifting the rear of RV 102 immediately thereafter. Next, in the third portion of the automatic deployment process, controller 302 provides control signals to valve manifold 304, causing the two individual valves associated with the rear jacks 104 to open, and sending fluid to the extend ports of the cylinders of the rear jacks 104. The valves remain open for the predetermined drive time calculated above to achieve the desired extension of the rear jacks 104. Once the rear jacks are extended, RV 102 is stabilized and nearly level from front to rear, if parked on a level surface. In summary, controller 302 extends the front and rear jacks, in pairs, for a predetermined time associated with each pair, but does not rely on a level sensor to determine the disposition of RV 102.

Following the automatic deployment of jacks 104, manual adjustments of individual jacks 104 can be made using User I/O panel 408. When controller 302 determines that "Extend" sensor 508 has been contacted, controller system enters extend mode. Then, when any one or more of "Left Front" touch sensor 512, a "Right Front" touch sensor 514, a "Left Rear" touch sensor 516, and a "Right Rear" touch sensor 518 are contacted, controller 302 provides control signals to the valve manifold 304, causing hydraulic fluid to be provided to the extend port(s) of the jack(s) 104 associated with the contacted sensor(s) 512, 514, 516, and/or 518, and causing extension of the selected jacks for so long as the sensors remain contacted. When controller 302 determines that "Retract" sensor 508 has been contacted, controller system enters retract mode. Then, when any one or more of "Left Front" touch sensor 512, a "Right Front" touch sensor 514, a "Left Rear" touch sensor 516, and a "Right Rear" touch sensor 518 are contacted, controller 302 provides control signals to the valve manifold 304, causing hydraulic fluid to be provided to the retract port(s) of the jack(s) 104 associated with the contacted sensor(s) 512, 514, 516, and/or 518, and causing retraction of the selected jacks for so long as the sensors remain contacted.

When controller 302 determines that "Retract All" touch sensor 506 has been contacted, controller 302 executes the auto retract function, as follows. In one embodiment, controller 302 provides control signals to valve manifold 304 to cause hydraulic fluid to be provided to the retract ports of the cylinders of all four jacks (thereby retracting jacks 104) so long as the "Retract All" touch sensor 506 remains contacted. Responsive to signals from limit sensors 310, controller 302 provides feedback to the operator (e.g., by indicator light 520 associated with "Retract All" touch sensor 506) indicating whether all of jacks 104 have successfully refracted. If all jacks 104 have not fully retracted after a predetermined timeout period, an alert is provided to the operator. In an alternative embodiment, maintaining contact with "Retract All" touch sensor 506 is not required, and a single contact of "Retract All" touch sensor 506 will cause controller 302 to continue retracting all jacks 104 until limit sensors 310 indicate that all jacks 104 have successfully retracted, or until a timeout period has elapsed.

In this example embodiment, all jacks 104 should be in their fully refracted positions in order to initiate the auto deploy function, because the predetermined extend times are calculated based on jacks 104 being in their fully refracted positions. If an operator attempts to initiate the auto deploy function when one or more of jacks 104 are partially extended, controller 302 can provide a prompt to the operator to retract all jacks 104 prior to redeploying jacks 104 with the auto deploy function. Optionally, controller 302 can initiate the auto retract function and then, when jacks 104 are fully retracted, automatically initiate the auto deploy function.

An optional safety feature provides an alarm to the operator if the operator attempts to move (e.g., turns on ignition switch or other indicator) RV 102 when all jacks 104 are not fully retracted.

Another advantage of the present invention is that a single version of controller 302 can be used in a wide variety of different vehicles and applications, simply by programming controller with the predetermined time value(s) required for a particular vehicle/application. As an option, means for reprogramming the predetermined time value(s) can be provided to facilitate adjustment of the predetermined time value(s) by manufacturers, suppliers, and/or end users.

Figure 6:
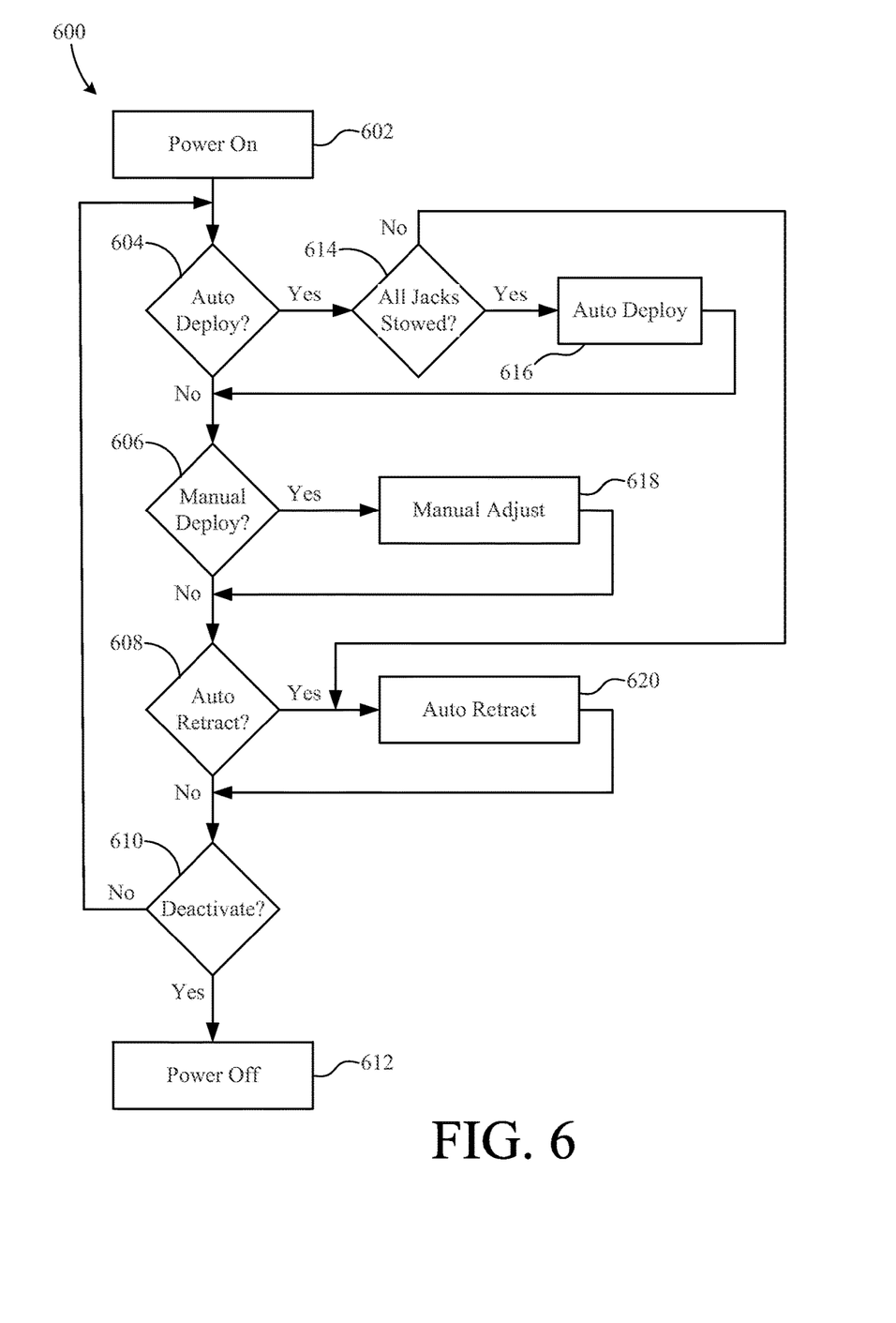
FIG. 6 is a flow chart summarizing an example method of leveling a vehicle implemented by the controller of FIG. 3.

FIG. 6 is a flow chart summarizing an example method 600 of leveling a vehicle implemented by the control panel of FIG. 3. In a first step 602, the system is powered on. Then, in a second step 604, it is determined whether the automatic deployment function has been selected. If not, then in a third step 606, it is determined whether the manual deployment function has been selected. If the manual deployment function has not been selected, then in a fourth step 608, it is determined whether the automatic retract function has been selected. If not, then in a fifth step 610 it is determined whether deactivation has been selected. If so, then in a sixth step 612, the system powers off. If, on the other hand, deactivation has not been selected, then method 600 returns to step 604 and repeats the foregoing loop until one of the functions or deactivation is selected.

If, in second step 604, it is determined that the automatic deployment function has been selected, then method 600 proceeds to seventh step 614, where it is determined whether all jacks are in their stowed positions. If so, then in an eighth step 616, the automatic deployment function is performed, and method 600 returns to third step 606. If, in seventh step 614, it is determined that all jacks are not in their fully stowed positions, then method 600 proceeds to a tenth step 620, where the automatic retraction function is performed.

If, in third step 606, it is determined that the manual deployment function is selected, then in a ninth step 618, the manual adjustment function is implemented. Then, when manual adjustment is completed, method 600 proceeds to fourth step 608.

If, in fourth step 608, it is determined that the automatic retraction function has been selected, then in tenth 620, the automatic refraction function is performed. Then, method 600 returns to fifth step 610.

Figure 7:
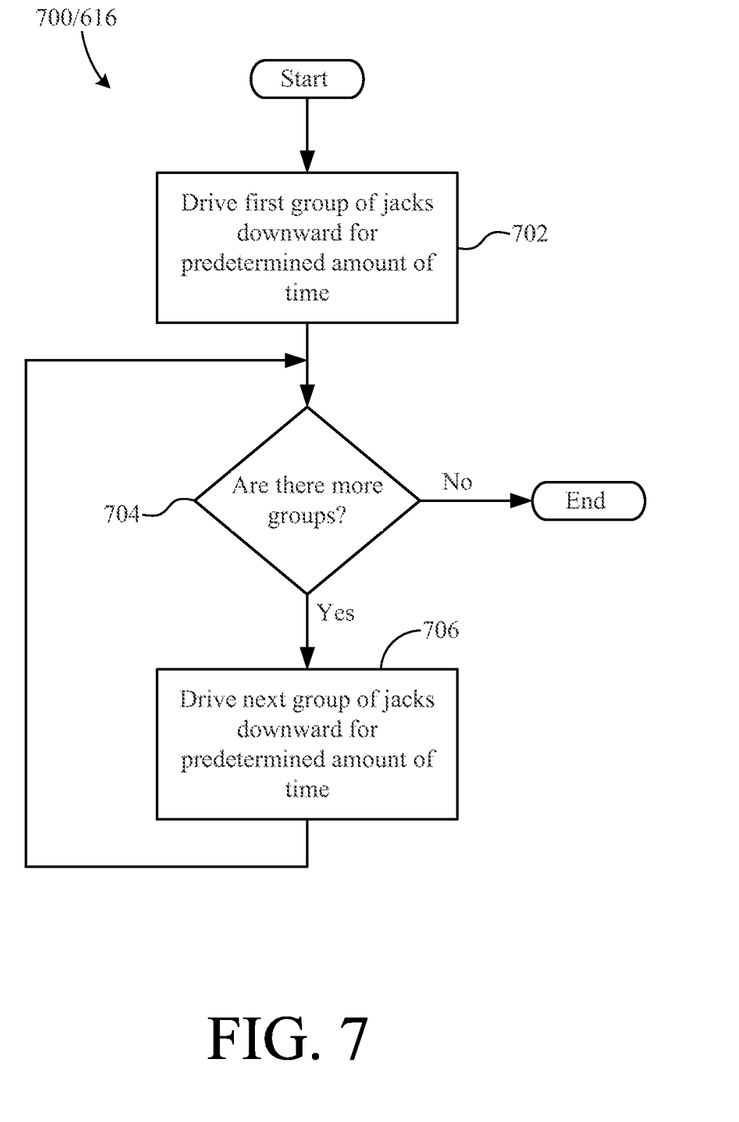
FIG. 7 is a flow chart summarizing an example method of performing the Auto Deploy step of the method of FIG. 6.

FIG. 7 is a flow chart summarizing an example method 700 of performing the Auto Deploy step 616 of method 600 of FIG. 6. In a first step 702, a first group of jacks is driven downward for a predetermined amount of time. Next, in a second step 704, it is determined whether there are any more groups of jacks to be deployed. If not, method 616 ends. Otherwise, in a third step 706, the next group of jacks is driven downward for a predetermined amount of time. Then, method 700 returns to second step 704 to determine whether there are any more groups of jacks. Method 700 continues until it is determined in second step 704 that there are no more groups of jacks to be deployed.

Figure 8:
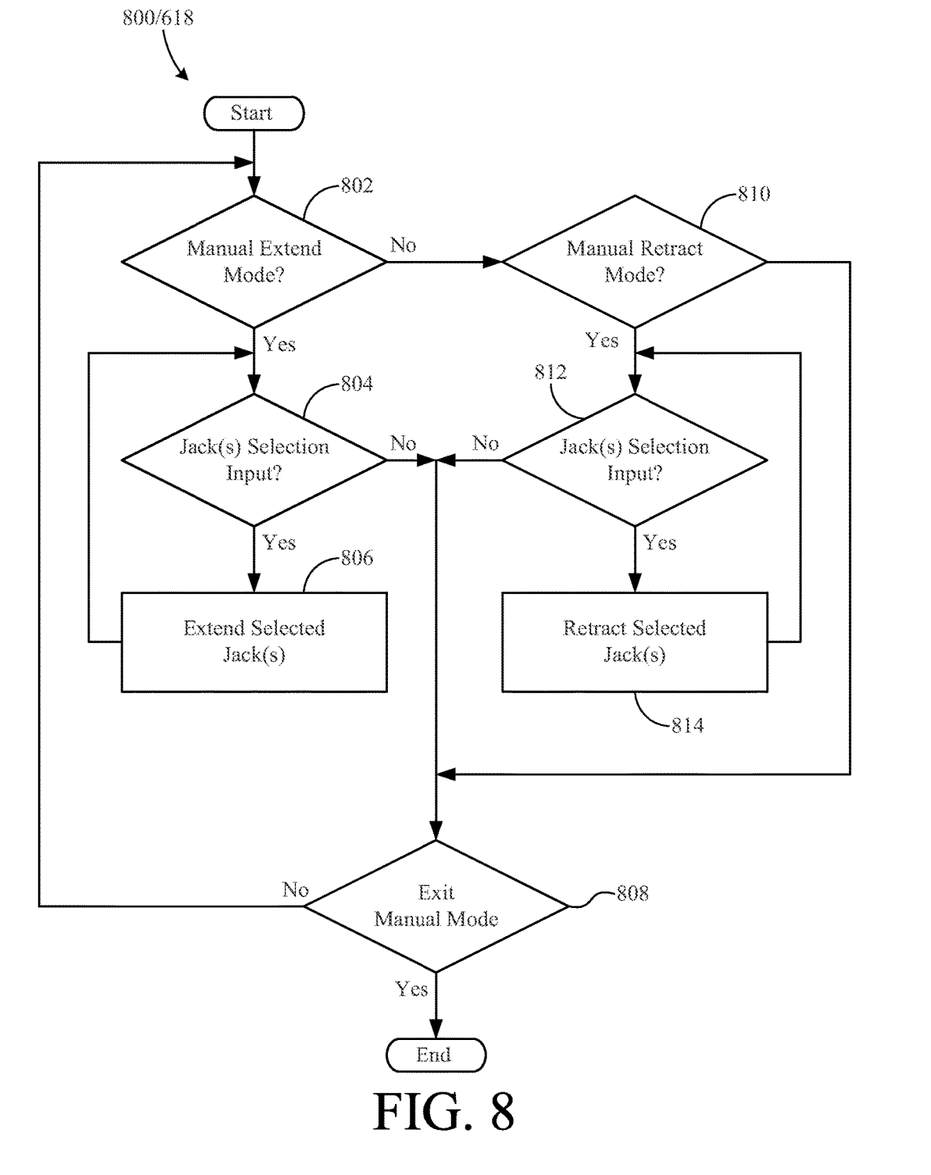
FIG. 8 is a flow chart summarizing an example method of performing the Manual Adjust step of the method of FIG. 6.

FIG. 8 is a flow chart summarizing an example method 800 of performing the Manual Adjust step 618 of the method of FIG. 6. In a first step 802, it is determined whether the manual extend mode has been selected. If so, then in a second step 804 it is determined whether one or more jacks have been selected. If one or more jacks are selected, then in a third step 806, the extension of the selected jacks is initiated, and method 800 returns to step 804 to determine whether the selected jack(s) remain selected. If so, extension of the selected jack(s) continues. If not, method 800 proceeds to a fourth step 808 and determines whether or not to exit manual mode. If there is an indication to exit manual mode, then method 800 ends. Otherwise, method 800 returns to first step 802.

If, in first step 802, it is determined not to enter manual extend mode, then method 800 proceeds to a fifth step 810, where it is determined whether the manual retract mode has been selected. If so, then in a second step 804 it is determined whether one or more jacks have been selected. If not, then method 800 proceeds to fourth step 808. However, if one or more jacks are selected, then in a sixth step 812, refraction of the selected jacks is initiated, and method 800 returns to step 812 to determine whether the selected jack(s) remain selected. If so, retraction of the selected jack(s) continues. If not, method 800 proceeds to fourth step 808 and determines whether or not to exit manual mode.

Figure 9:
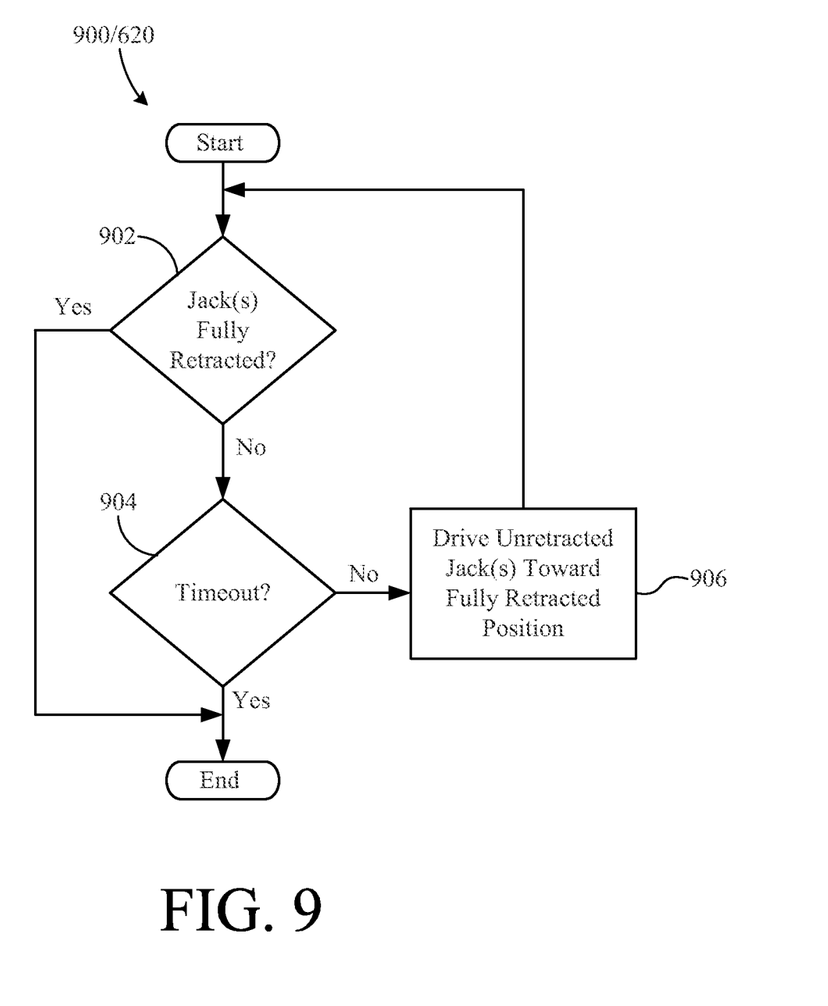
FIG. 9 is a flow chart summarizing an example method of performing the Auto Retract step of the method of FIG. 6.

FIG. 9 is a flow chart summarizing an example method 900 of performing the Auto Retract step of the method of FIG. 6. In a first step 902, it is determined whether all of the jacks are fully retracted. If so, method 900 ends. If not, then in a second step 904 it is determined whether a timeout condition has been met. If so, method 900 ends and optionally provides an error message indicating that all of the jacks might not be in their fully retracted positions. If the timeout condition is not met, method 900 proceeds to step 906 where the unretracted jacks are driven toward their fully retracted positions. Method 900 continues until all jacks are in their fully retracted condition or until the timeout condition is met.

The description of particular embodiments of the present invention is now complete. Many of the described features may be substituted, altered or omitted without departing from the scope of the invention. For example, alternate jack types (e.g., electric jacks), may be substituted for the hydraulic jacks shown. As another example, the leveling/stabilization system and method will be advantageous in other types of vehicles including, but not limited to trailers, utility trucks, construction equipment, and so on. These and other deviations from the particular embodiments shown will be apparent to those skilled in the art, particularly in view of the foregoing disclosure.

We claim:

1. A leveling system for a vehicle, said leveling system comprising:
   a jack adapted to be fixed to said vehicle and extendable from a stowed position to an auto-deployed position;
   an actuator coupled to said jack and operative to extend and retract said jack;
   a user interface device adapted to receive input from a user; and
   a controller responsive to an auto-deploy signal from said user interface and operative to provide control signals to said actuator causing said actuator to continuously extend said jack from said stowed position for a predetermined time period, thereby positioning said jack in said auto-deployed position; and wherein
   the duration of said predetermined time period depends on the distance between said jack and the ground when said jack is in said stowed position; and
   said controller operates without input from a level sensor.

2. The leveling system of claim 1, wherein the duration of said predetermined time period depends on physical characteristics of said vehicle and a relative position of said jack with respect to said vehicle.

3. The leveling system of claim 2, wherein the duration of said time period additionally depends on physical characteristics of said actuator.

4. The leveling system of claim 1, wherein the duration of said predetermined time period additionally depends on an amount of lift required to take weight of said vehicle off of the suspension of said vehicle.

5. The leveling system of claim 1, wherein said actuator is a hydraulic actuator.

6. The leveling system of claim 1, additionally comprising:
   a plurality of jacks, said jacks of said plurality of jacks being grouped into at least a first group and a second group; and wherein
   said controller responsive to said auto-deploy signal from said user interface is operative to provide control signals to said actuator causing said actuator to continuously extend said jacks of said first group from said stowed positions of said jacks of said first group for said predetermined time period, thereby positioning said jacks of said first group in said auto-deployed position, and to provide control signals to said actuator causing said actuator to continuously extend said jacks of said second group from said stowed positions of said jacks of said second group for a second predetermined time period, thereby positioning said jacks of said second group in said auto-deployed position.

7. The leveling system of claim 6, wherein said actuator includes an individual actuator for each said group of jacks.

8. The leveling system of claim 6, wherein said actuator includes an individual actuator for each said jack.

9. The leveling system of claim 6, wherein the duration of said predetermined time period is different than said duration of said second predetermined time period.

10. The leveling system of claim 1, additionally comprising a sensor responsive to a position of said jack and operative to provide a signal to said controller indicative that said jack is in said stowed position.

11. The leveling system of claim 1, additionally comprising memory for storing a time value associated with said predetermined time period.

12. The leveling system of claim 11, wherein said time value is reconfigurable.

13. In a leveling system, a method for automatically deploying a plurality of jacks from a stowed position to an auto-deployed position, said method comprising:
   receiving input from a user indicating that said jacks are to be auto-deployed;
   determining whether all of said jacks are in said stowed position;
   retrieving a time value associated with a first group of said jacks; and
   driving said first group of said jacks for a predetermined time period based on said time value, thereby deploying said jacks of said first group from their stowed positions to their auto-deployed positions, the time value depending on the distance between at least one of said jacks and the ground when said at least one of said jacks is in said stowed position; and wherein
   said step of driving said first group of said jacks for a predetermined time period includes driving said first group of said jacks without receiving input from a level sensor.

14. The method of claim 13, additionally comprising:
   retrieving a second time value associated with a second group of said jacks; and
   driving said second group of said jacks for a second predetermined time period based on said second time value, thereby deploying said jacks of said second group from their stowed positions to their auto-deployed positions.

15. The method of claim 13, wherein said step of determining whether all of said jacks are in said stowed position includes receiving sensor input from each jack indicating that each jack is fully retracted.

16. The method of claim 13, wherein said step of determining whether all of said jacks are in said stowed position includes retracting said jacks until all of said jacks are in their stowed positions.

17. A leveling system for a vehicle, said leveling system comprising:
   a jack adapted to be fixed to said vehicle and extendable from a stowed position to a predetermined auto-deployed position;
   an actuator coupled to said jack and operative to extend and retract said jack;

a user interface device adapted to receive input from a user; and a controller responsive to an auto-deploy signal from said user interface and operative to provide control signals to said actuator causing said actuator to continuously extend said jack from said stowed position for a predetermined time period, thereby positioning said jack in said auto-deployed position, said predetermined time period depending on the distance between said jack and the ground when said jack is in said stowed position; and wherein said controller provides said control signals without input from a level sensor.

18. A controller for a leveling system of a vehicle, said controller comprising:

a user interface device adapted to receive input from a user;

memory for storing data and code, said data including an auto-deploy time value;

a drive interface for providing control signals to a jack; and a processing unit operative to process said code and, responsive to an auto-deploy signal from said user interface, operative to provide control signals via said drive interface to continuously extend said jack for a time period corresponding to said auto-deploy time value, said auto-deploy time value depending on the distance between said jack and the ground when said jack is in said stowed position; and wherein said processing unit provides said control signals without input from a level sensor.

* * * * *